April 24, 1928. 1,667,534
R. F. CARPENTER ET AL
PARTITION STRUCTURE
Filed May 7, 1924 5 Sheets-Sheet 1
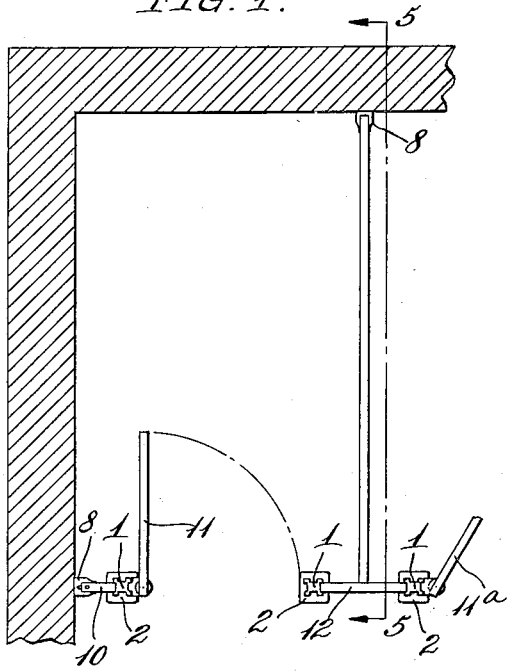
FIG. 1.
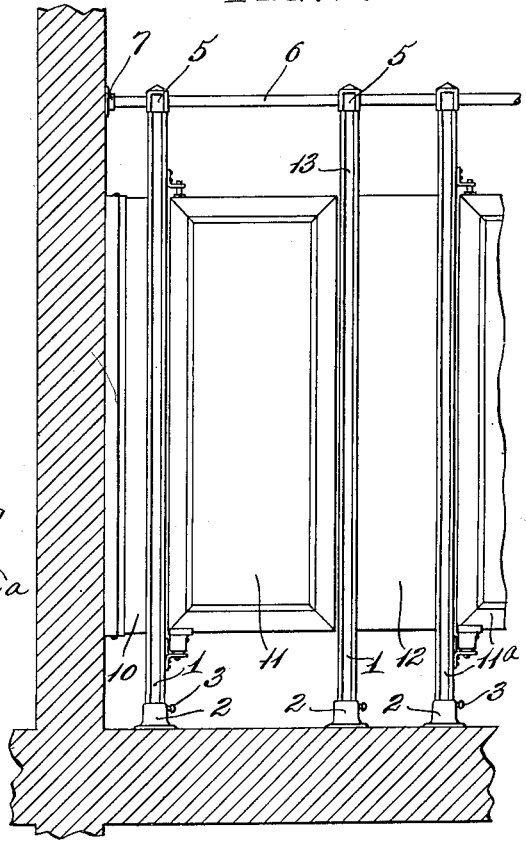
FIG. 2.
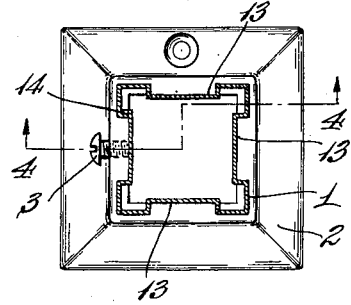
FIG. 3.
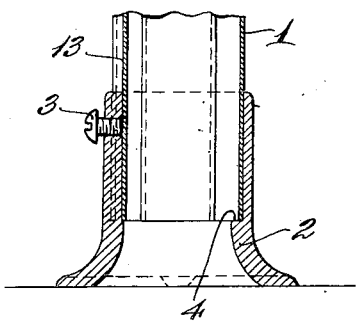
FIG. 4.
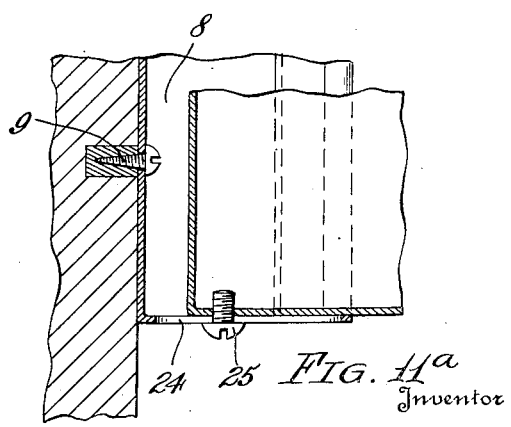
FIG. 11ᵃ
Inventor
Robert F. Carpenter
Thomas F. Anderson
By Brockett, Hyde & Milburn
Attorneys

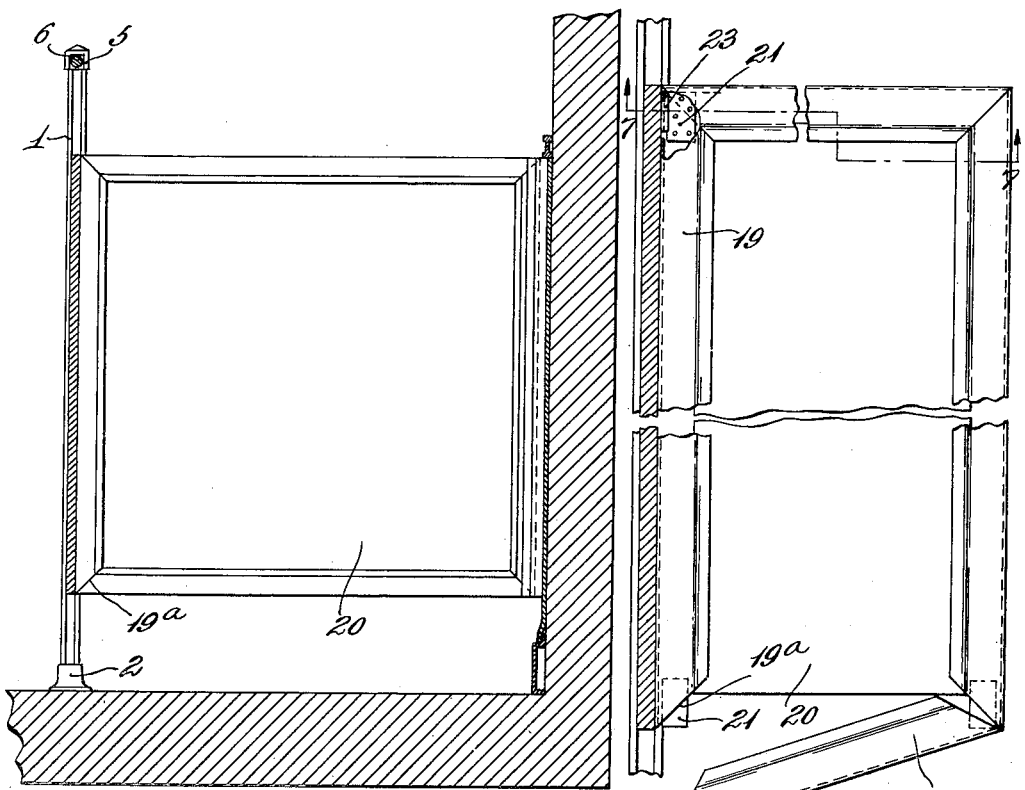
FIG. 5.
FIG. 6.
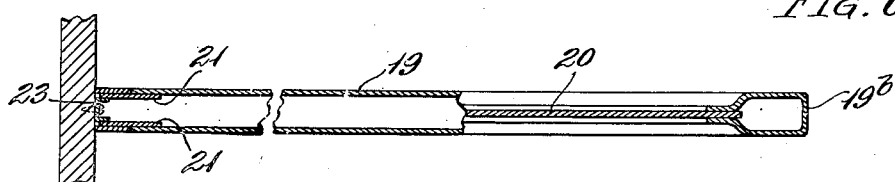
FIG. 7.
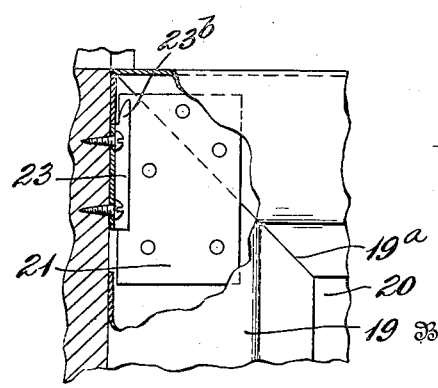
FIG. 8.
Inventor
Robert F. Carpenter
Thomas F. Anderson
By Brockett, Hyde & Milburn
Attorneys

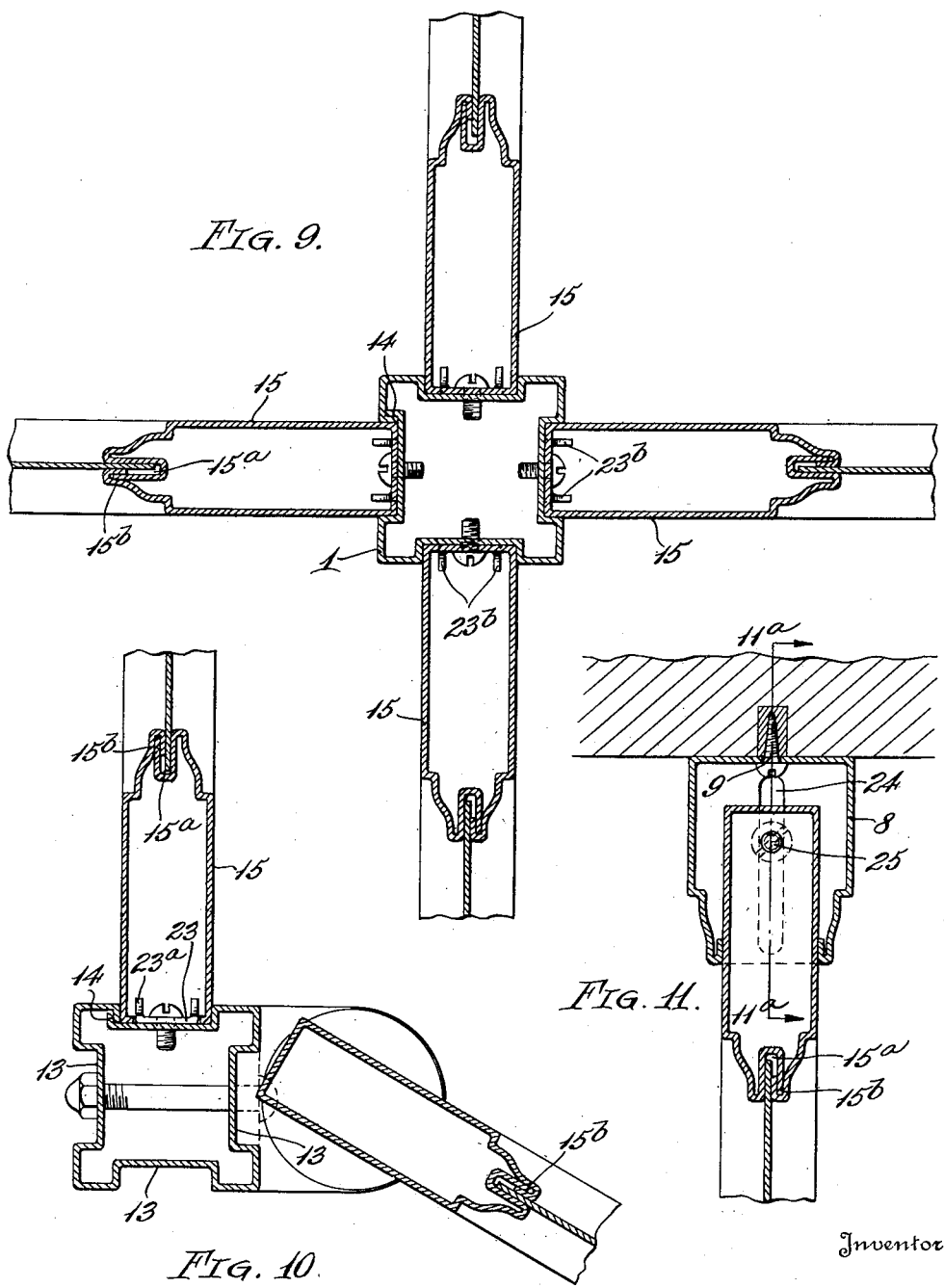

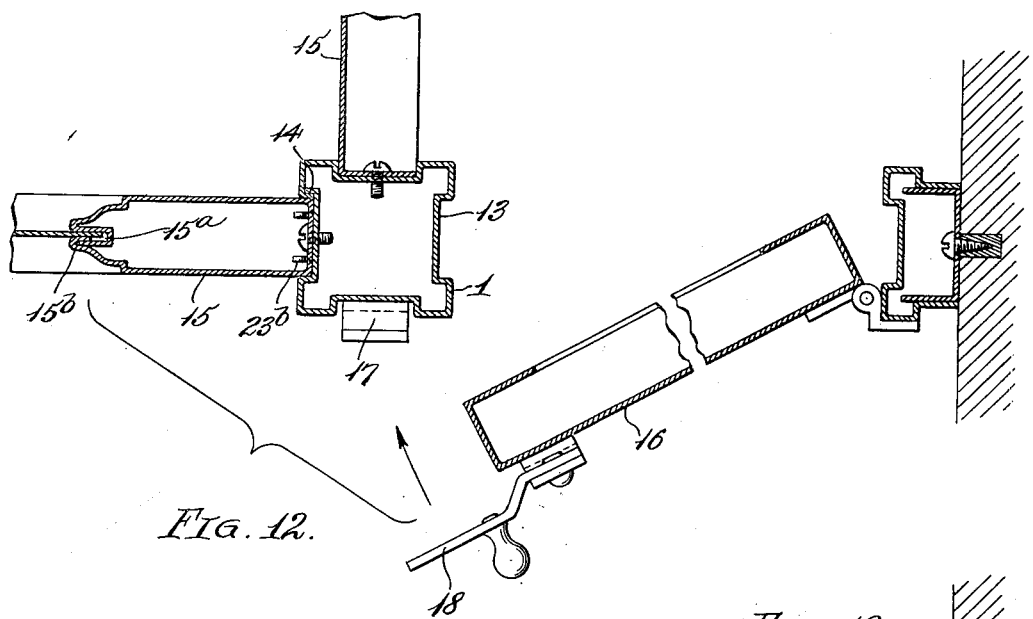
FIG. 12.
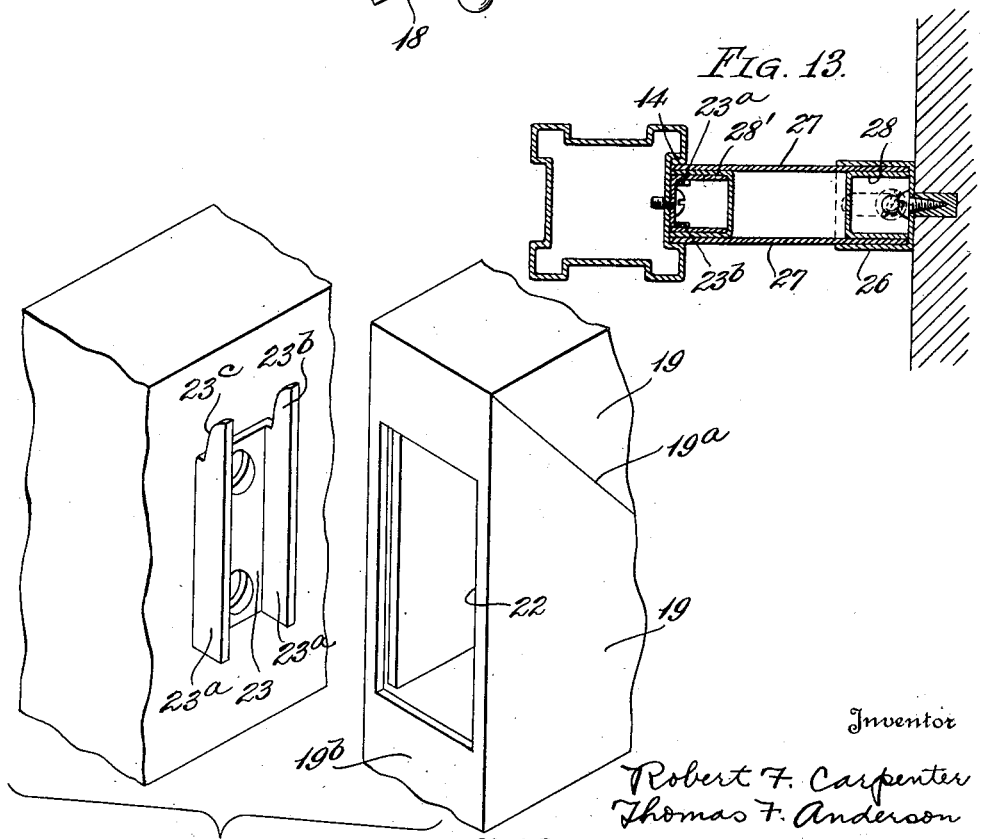
FIG. 13.
FIG. 14.

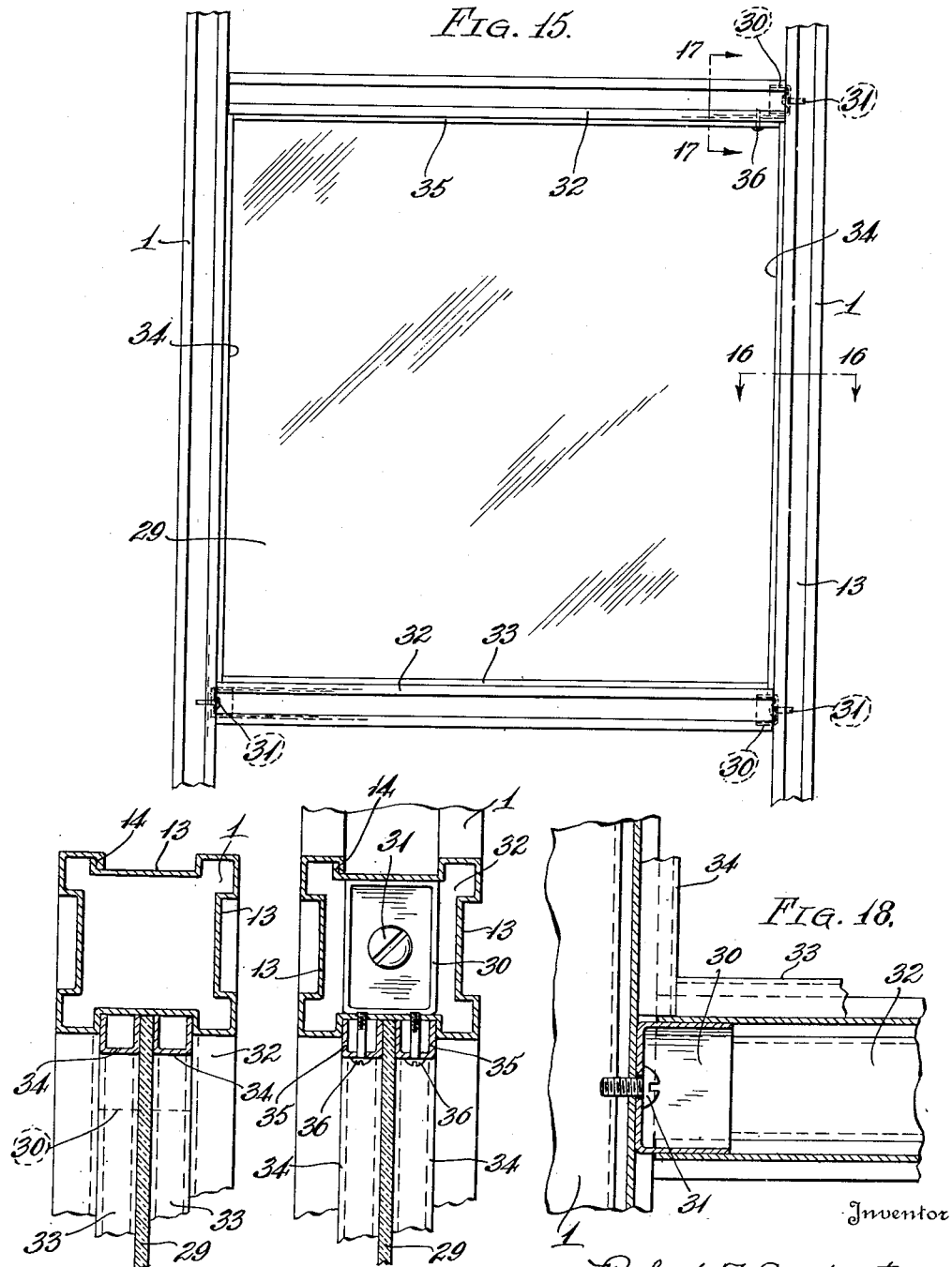
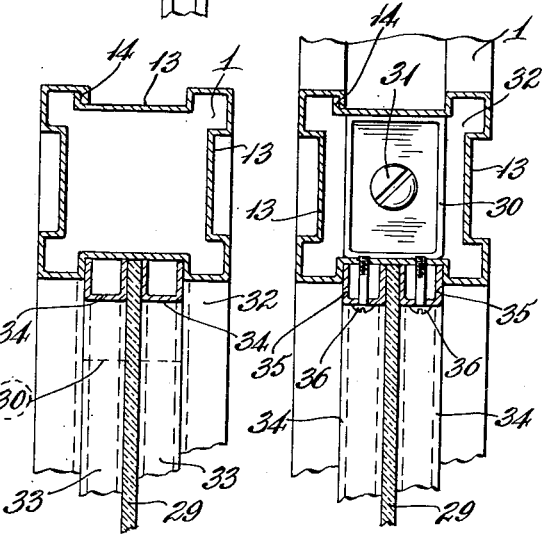
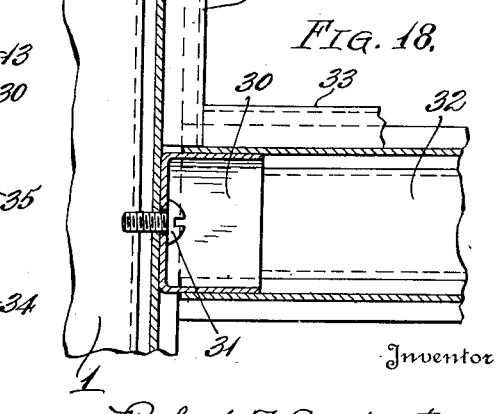

Patented Apr. 24, 1928.

1,667,534

UNITED STATES PATENT OFFICE.

ROBERT F. CARPENTER AND THOMAS F. ANDERSON, OF CLEVELAND, OHIO, ASSIGNORS TO THE SANYMETAL PRODUCTS COMPANY, OF CLEVELAND, OHIO, A CORPORATION OF OHIO.

PARTITION STRUCTURE.

Application filed May 7, 1924. Serial No. 711,589.

This invention relates to improvements in partition structures especially adapted for use in connection with offices, toilets and the like.

The objects of this invention are to provide a hollow sheet metal post of polygonal form which is made of a single piece of sheet metal and which is so constructed as to be adapted for practically universal use at different points in a partition structure; to provide means for adjusting and fixing in adjusted position a filler panel; to provide an improved means for engaging the panels with the posts or wall molding; and to provide also an improved panel structure.

Other objects of this invention will appear from the following description and claims when considered together with the acompanying drawings.

Fig. 1 is a transverse sectional view of a portion of an installation of a partition structure; Fig. 2 is a front elevation corresponding to Fig. 1; Figs. 3 and 4 are transverse and vertical sections of the base support for the square, sheet metal, hollow post; Fig. 5 is a view taken on line 5—5 of Fig. 1; Fig. 6 is a view illustrating the manner of making up the panel structure; Fig. 7 is a view taken on line 7—7 of Fig. 6; Fig. 8 is a detailed view illustrating the corner joint of the improved panel structure; Figs. 9 and 10 illustrate the different uses to which our improved sheet metal post may be put; Figs. 11 and 11ᵃ illustrate our improved adjustable filler for the panel; Fig. 12 illustrates another adaptation of our improved sheet metal square post; Fig. 13, illustrates another form of adjusting and securing means for the filler panel; Fig. 14 is a detailed perspective view of the means for engaging the panels with the post or wall for supporting the same; Fig. 15 shows in elevation another manner of using the square post for panel partitions; Figs. 16 and 17 are sectional views taken on lines 16—16 and 17—17 respectively, of Fig. 15; and Fig. 18 is a detail sectional view of the corner portion.

Referring to Figs. 1 and 2, it will be understood that the improved hollow, sheet metal, square post 1 is supported in the base member 2, which rests on the floor and which receives the lower end of the post, a set screw 3 being provided for securing the same in adjusted position. By loosening the screw 3 the post may be raised or lowered to the desired height and then secured in such set postion. A shoulder 4 is provided at the bottom part of the base support 2 to serve as a rest for the lower end of the post in case it occupies lowermost position. The upper ends of the hollow sheet metal posts 1 are adapted to receive the caps 5 which have their lower ends inserted in the upper end of the post and through which extend the top rails or rods 6, which in turn are supported in the ferrules 7 on the wall. The molding members 8 are secured to the wall by means of wood screws 9 and are adapted to receive the stiles which form the marginal portion of the panels. As illustrated in Fig. 1, the front panel 10 has its outer edge engaging in the groove of the square post which in turn has hinged thereupon the door 11, while the front panel 12 has its two edges engaging in the grooves of square posts, one of which posts is adapted to receive the free edge of the door 11 while the other has hinged thereto the door 11ᵃ. This will serve to illustrate in a general way an installation of our improved partition structure.

The hollow, square post is formed up from a single piece of sheet metal which is given the form illustrated in the figures of the drawings with the longitudinal square grooves 13 along all four sides thereof and with the marginal edge portions thereof flanged so as to form an interlocking joint 14. It is to be understood that such a post may be constructed of any suitable polygonal form, the present form however being best adapted for the use for which it is intended. As illustrated in Fig. 9 for instance, it will be seen that this post may serve as the center post of four partitions whose marginal stile members 15 engage the four grooves thereof; while in Fig. 10 it will be seen that the same form of post may be used at a point where one groove receives the stile member 15 of a partition panel while on another side of the post there is mounted a hinge upon which is swung a door. In this case the other two sides of the post may be free. In other words, the post in this instance may occupy a position at the corner of a compartment. In Fig. 12, it will be seen that this same form of post may have engaged in the grooves on two sides thereof the stiles 15 of two partition panels in the same manner as before referred to, while the free edge of a swinging door 16 may engage another side of the post with a keeper 17 mounted in the fourth groove of the post to receive the latch 18 carried by the door. This will serve to illustrate in a general way some of the many uses to which the same structure of sheet metal, hollow, square post may be put.

We have provided also an improved structure of partition panel together with improved means for securing the same in position on the hollow square post. By referring to Fig. 6, it will be seen that the single strip of sheet metal, which is first given the form of a stile member 19 like those illustrated throughout the several figures of the drawing, is formed with a mitre 19ª at each of the four corners so as to permit the same to be bent up to a rectangular form about the panel member 20. The corners are secured against accidental separation by means of clips 21 which are spot-welded across the abutting edges of the cornice, these clips being located on the inside of the hollow stile or molding member 19. These clips may have one end welded in position inside of the stile member 19 before bending up the same into rectangular form, and then access may be had to the inside thereof after it is closed up about the panel member 20 by means of the openings 22 which are provided in the bottom portions of the up-right sides of the stile members 19. These openings form also a part of the means for securing or supporting the partition members upon the wall molding or upon the square posts, as the case may be. This is illustrated in detail in Fig. 14, where it will be seen that a clip 23 is secured in any suitable manner in the bottom of the groove of the hollow sheet metal post, this clip being provided with side flanges 23ª which terminate in upwardly extending end portions 23ᵇ. These end portions are slightly curved as shown at 23ᶜ, which together with the thickness of the metal itself permits ready insertion of the clip in the opening 22 in such a manner that the ends 23ᵇ extend upwardly back of the bottom portion 19ᵇ of the stile member just above the opening 22. These clips are formed as metal blanks and the marginal portions are then bent upwardly to form the flanges 23ª illustrated in the drawing. Thus the openings in the bottom wall of the stile member have a dual function, viz: that of forming part of the supporting means for the partitions and also that of affording access to the interior of the stile member for the purpose of welding in position the clips 21.

Sheet metal or any other suitable material may be used for the partition panel 20; and it is to be understood that the stile for the partition panel may be given any suitable form, the present particular form of integral sheet metal with the marginal edge portions bent to form a groove 15ª and interlocking joint 15ᵇ, being found very effective. This form of stile also presents a very neat appearance.

The particular form of hinge which is here shown upon the square posts is the same form of gravity roller hinge which is covered by our patent for hinge, Serial No. 1,608,299, granted November 23, 1926. It should be explained that the bolt shown as securing this hinge upon the post extends through the post at a point below the bottom edge of the door or partition or wall member, these bolts extending through a depending bracket provided on the stationary hinge member. Any suitable form of hinge however, may be used.

As clearly indicated in the drawing, the wall molding member 8 is of hollow sheet metal form and has its upper and lower ends closed. The stile member of the filler partition is adapted to be inserted into the open side of the wall molding member and has its upper and lower ends also closed, the wall molding member and the stile member being of substantially the same length, except that one is adapted to fit within the other. The top and bottom ends of the wall molding member are each provided with a slot 24 through which extends a set screw 25 which in turn is secured in each of the top and bottom ends of the stile member. With this arrangement it is possible to loosen the set screws and adjust the filler partition so as to extend more or less into the wall molding member, according to the space which it is desired to fill with this filler. In Figs. 11 and 11ª the form shown is intended for a condition where the space is greater than that for which the form in Fig. 13 is intended, the principle of operation however being the same in the two cases. In the form shown in Fig. 13 where there is less space to be filled by the filler partition and hence where the adjustment is of less degree, instead of using the wall molding and the stile member, we have used a channel form of wall molding 26 which has its upper and lower ends closed, and which is adapted to receive the marginal portion of the filler partition. The filler in this case is formed of two sheets of metal 27 which have their marginal portions welded to the sides of U-shaped channel members 28 and 28'. These channel members 26, 28 and 28' have their upper and lower ends closed also and are provided with the same means of adjustment as described in Fig. 11. The bottom of channel member 28' is supported upon the square post by means of clips 23 in the same manner as already described.

As a result of the particular form of sheet metal post, this element of structure is standardized to such an extent that it may be used at a number of different points in building up a partition structure and hence the cost of erection of such a structure is reduced. At the same time the appearance is considerably improved, by reason of the fact that the structure is given a more uniform appearance at the different points throughout. The other features pointed out contribute also to the simplicity as well as the neat appearance of partition structures.

Furthermore, the clips 23 afford a means of readily mounting double-wall panels which have both walls completely closed and which therefore can not be attached by screws in the manner illustrated in Fig. 12. The use of single-wall panels and screws may be resorted to however in cases where the open-side of the panel is not ordinarily exposed to view.

Figs. 15 to 18 illustrate a still further manner in which our improved post can be used in partition structures, whether the panel 29 be of glass or metal. In this particular form of installment, the rectangular metal studs 30 are secured in the channels or grooves 13 of the upright posts by means of screws 31 through the bottom of the studs, as clearly shown. These studs serve to support the laterally extending sections 32 of a square post, which is of the same form as the up-right square posts; the ends of the sections 32 engaging over the studs 30 with a snug fit. The channel bars 33 lie in the upper channel or groove of the lower post section 32 and engage the opposite edge portions of the panel 29, these bars resting by gravity in such position. The ends of bars 33 do not extend the full length of the section 32 but extend between the lower end portions of the upright channel bars 34 so as to maintain the same in position along the opposite vertical marginal portions of the panel. The channel bars 35 are secured in position by means of screws 36 so as to engage the upper margins of the panel. These channel bars are of the same length as bars 33 so as to extend between the upright bars and thereby support the same.

What we claim is:

1. In building structures, an adjustable partition structure including an upright channel member having a substantially horizontally extending bottom supporting flange provided with a slot, and a partition engaging within said channel member and seated upon the bottom flange thereof, said partition being provided with a set screw cooperating with said flange slot so as to enable said channel member and said partition to be secured together in any adjusted position.

2. In building structures, a fixed supporting member, a panel made up of a plurality of parts, means within said panel for securing the parts thereof together, means for securing said panel to said supporting member including a clip provided upon said supporting member, said panel being provided with an opening for the reception of said clip, said opening being so constructed and arranged as to afford the necessary access to that portion of the interior of said panel wherein is adapted to be located the means for securing the panel parts together.

3. In building structures, a partition unit comprising a panel member and a hollow stile member, and means inside said stile member for securing the same in assembly with said panel member, said stile member being provided with an opening permitting access to the interior thereof in the region of said securing means and serving also as a means of supporting said partition unit.

4. In a building structure, an adjustable partition structure including an upright channel having a substantially horizontally extending bottom supporting flange member, and a partition member engaging within said channel and seated upon the bottom flange member thereof, one of said members being provided with a slot to receive a set screw carried by the other member, said slot and said set screw enabling said channel and the partition member to be secured together in any adjusted position.

5. In a building structure, a supporting member provided with a vertically extending groove, a partition supporting projection carried by said supporting member and lying substantially entirely within the groove thereof, and a partition adapted to be mounted upon said supporting member with an end portion of the former lying within the groove of the latter, said partition end portion being provided with an opening to receive the supporting projection of said supporting member, said projection and said opening constituting the means by which said partition is mounted upon said supporting member.

In testimony whereof we hereby affix our signatures.

ROBERT F. CARPENTER.
THOMAS F. ANDERSON.